United States Patent
Ajmera et al.

(10) Patent No.: US 9,727,652 B2
(45) Date of Patent: Aug. 8, 2017

(54) UTILIZING DEPENDENCY AMONG INTERNET SEARCH RESULTS

(71) Applicant: International Business Machines Corporation, Armonk, NY (US)

(72) Inventors: Jitendra Ajmera, Bangalore (IN); Ajay Gupta, Bangalore (IN); Sachindra Joshi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 13/947,320

(22) Filed: Jul. 22, 2013

(65) Prior Publication Data

US 2015/0026164 A1 Jan. 22, 2015

(51) Int. Cl.
*G06F 17/30* (2006.01)

(52) U.S. Cl.
CPC .. *G06F 17/30867* (2013.01); *G06F 17/30864* (2013.01)

(58) Field of Classification Search
CPC ................................. G06F 17/30864
USPC ........................ 707/723, 736, 915
See application file for complete search history.

(56) References Cited

U.S. PATENT DOCUMENTS

| | | | | |
|---|---|---|---|---|
| 6,915,265 | B1 * | 7/2005 | Johnson | G06F 19/322 705/2 |
| 7,266,559 | B2 * | 9/2007 | Cook | G06F 17/3071 |
| 7,818,315 | B2 | 10/2010 | Cucerzan et al. | |
| 8,112,429 | B2 * | 2/2012 | Vadon | G06F 17/30702 707/751 |
| 8,126,888 | B2 | 2/2012 | Herlocker et al. | |
| 8,255,390 | B2 * | 8/2012 | Inagaki | G06F 17/30864 707/722 |
| 8,429,157 | B2 * | 4/2013 | Gnanamani | G06Q 30/02 707/723 |
| 8,645,390 | B1 * | 2/2014 | Oztekin | G06F 17/30867 707/721 |
| 2003/0158855 | A1 * | 8/2003 | Farnham | G06F 3/0481 |
| 2004/0059564 | A1 * | 3/2004 | Zhou | G06F 17/30672 704/4 |
| 2005/0278357 | A1 * | 12/2005 | Brown | G06F 17/30536 |
| 2006/0064411 | A1 * | 3/2006 | Gross | G06F 17/30864 |
| 2006/0161600 | A1 * | 7/2006 | Renz | G06F 11/3476 |
| 2007/0214131 | A1 * | 9/2007 | Cucerzan | G06F 17/30864 |
| 2008/0059508 | A1 * | 3/2008 | Lu | G06F 17/30707 |
| 2008/0114753 | A1 * | 5/2008 | Tal-Ezer | G06F 17/30864 |
| 2008/0235216 | A1 * | 9/2008 | Ruttenberg | G06Q 30/02 |
| 2010/0005069 | A1 * | 1/2010 | Wang | G06F 17/30867 707/E17.108 |
| 2011/0035402 | A1 * | 2/2011 | Agrawal | G06F 17/30864 707/769 |

(Continued)

*Primary Examiner* — Nargis Sultana
(74) *Attorney, Agent, or Firm* — Ryan, Mason & Lewis, LLP

(57) ABSTRACT

Techniques, systems, and articles of manufacture for utilizing dependency among internet search results. A method includes associating a user search query with a search task, identifying multiple information documents that correspond to the search task, and generating a recommended sequence of the multiple information documents to present to the user in response to the user search query, wherein the recommended sequence is based on dependency information associated with the multiple information documents.

19 Claims, 4 Drawing Sheets

(56) References Cited

U.S. PATENT DOCUMENTS

| | | | |
|---|---|---|---|
| 2011/0231386 A1* | 9/2011 | Wang | G06F 17/30864 707/709 |
| 2011/0302031 A1* | 12/2011 | Chen | G06Q 30/0255 705/14.53 |
| 2012/0036123 A1* | 2/2012 | Hasan | G06F 17/30386 707/723 |
| 2012/0197877 A1* | 8/2012 | Tunkelang | G06F 17/30424 707/723 |
| 2012/0233142 A1* | 9/2012 | Lawrence | G06F 17/30867 707/706 |
| 2012/0330939 A1* | 12/2012 | McCloskey | G06F 17/30867 707/723 |
| 2013/0282688 A1* | 10/2013 | Wong | G06F 17/30867 707/706 |
| 2013/0325651 A1* | 12/2013 | Virdhagriswaran | G06Q 30/0241 705/26.7 |

* cited by examiner

UTILIZING DEPENDENCY AMONG INTERNET SEARCH RESULTS

FIELD OF THE INVENTION

Embodiments of the invention generally relate to information technology, and, more particularly, to internet searching technologies.

BACKGROUND

Existing internet searching systems and approaches attempt to optimize the click-through rate for a single given user query, wherein a click-through rate refers to a measure of the number of result links clicked and/or selected in response to a given query. However, such existing searching approaches do not include consideration of a task-completion rate. In many cases, a user query is part of a larger task that requires accessing information from multiple documents and/or sources, potentially in a certain sequential order. The order and/or the correlation of the information, though, are not exploited by existing approaches and therefore, are never presented to the user. As a result, the users of such systems and approaches are encouraged and/or required to specify atomic requirements in the query. Additionally, existing approaches require a user attempting to execute a larger task to submit multiple independent queries to accomplish the task.

Accordingly, a need exists for discovering dependency among task-related search results and presenting resulting information to the user.

SUMMARY

In one aspect of the present invention, techniques for utilizing dependency among internet search results are provided. An exemplary computer-implemented method can include steps of associating a user search query with a search task, identifying multiple information documents that correspond to the search task, and generating a recommended sequence of the multiple information documents to present to the user in response to the user search query, wherein the recommended sequence is based on dependency information associated with the multiple information documents.

In another aspect of the invention, an exemplary computer-implemented method can include steps of receiving a user search query, associating the user search query with a search task, and identifying multiple information documents that correspond to the search task. The method also includes the steps of determining dependency of information among the multiple information documents based on information pertaining to one or more previous user searches associated with the multiple information documents, and generating a recommended sequence of the multiple information documents to present to the user in response to the user search query, wherein the recommended sequence is based on dependency information associated with the multiple information documents.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes presenting and exploiting dependency among search results. At least one embodiment of the invention includes discovering associations between various search-related tasks and user search queries. Such associations can be discovered between indexed documents based on previous browsing history of the user and one or more additional users and/or dependency information explicitly or implicitly marked in the search documents.

When a new user query arrives, at least one embodiment of the invention includes generating and considering multiple task hypotheses with corresponding probabilities P(Task=T|query=q). These probabilities represent the likelihood of a given query belonging to a task, and such estimates are derived based on prior search history. For each such hypothesized task, a recommended order of information sources is derived based on previous user browsing histories.

Subsequently, at least one embodiment of the invention includes providing these tasks along with the determined dependency information and/or recommended order of documents to the user. The dependency information constitutes the dependency of one search result on another, and is used to determine the recommended order of documents or search results. Such dependency information illustrates whether the viewing of a document or search result requires reading or viewing another document as a prerequisite to accomplishing a task. The dependency information, accordingly, is also a function of the hypothesized task.

Figure 1:
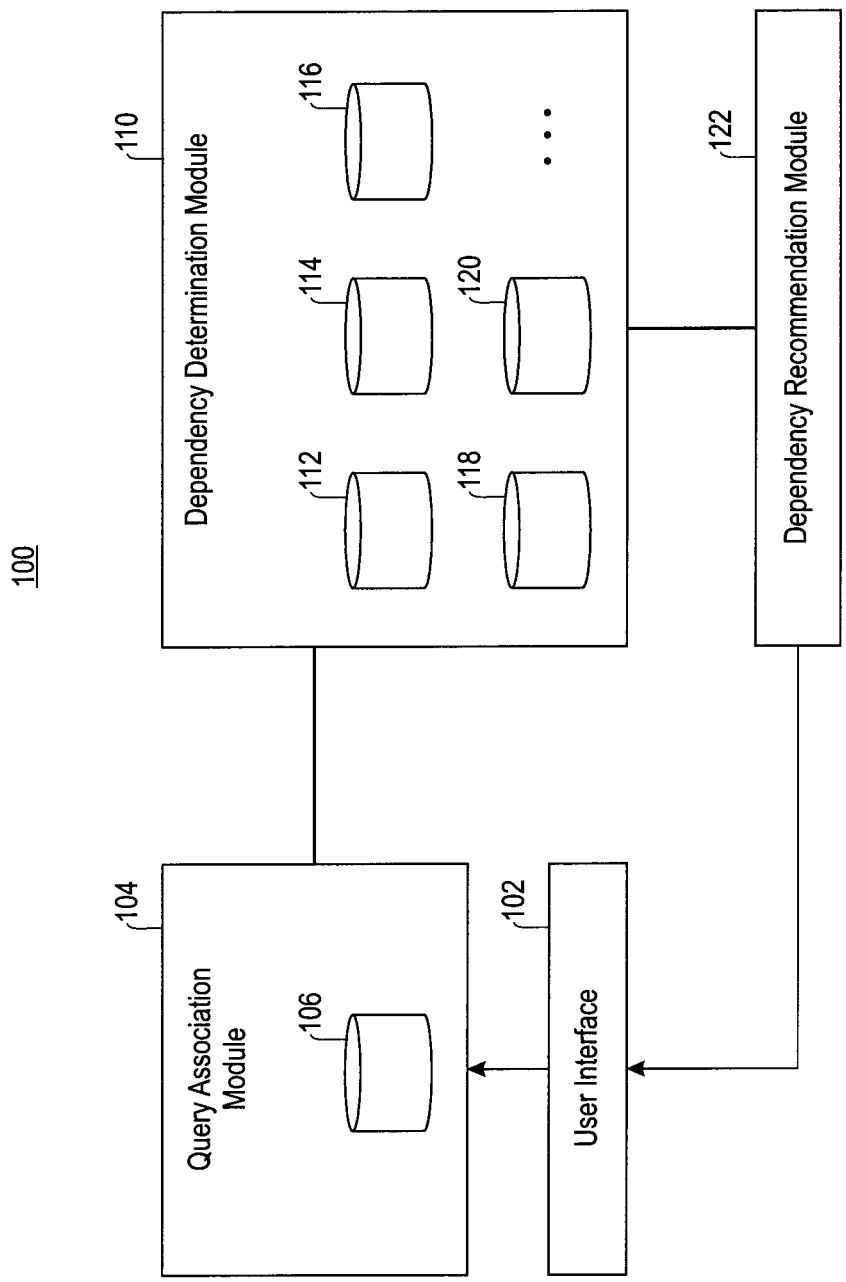
FIG. 1 is a diagram illustrating an example system implementing an embodiment of the invention.

FIG. 1 is a diagram illustrating an example system 100 implementing an embodiment of the invention. As described herein, at least one embodiment of the invention can include offline and online components. It should also be noted that at least one embodiment of the invention can be implemented entirely online. Accordingly, the following description should be understood merely as one exemplary means of implementing an embodiment of the invention.

As such, for example, as part of the offline component, at least one embodiment of the invention includes discovering and exploiting dependency of information documents from multiple databases via dependency determination module 110. This can be denoted, for example, via $P(D_2|D_1)$. Such a probability measures the dependency of $D_2$ on $D_1$. In other words, the probability represents how important it is to go through or access the contents of $D_1$ before proceeding to the contents of $D_2$. Here, in this detailed example, $D_2$ and $D_1$ are two indexed documents. The discovery of dependency information can ultimately facilitate generation of a recommended ordering of information documents in connection with a given search task, as further described herein.

Additionally, as depicted in FIG. 1, databases such as referenced above can include, for example, a database 112 maintaining previous user queries and session logs, a database 114 maintaining click-through logs, a database 116 maintaining outbound links present in various information documents, a database 118 maintaining case documentation (for example, in the case of call centers), and a database 120 maintaining procedural information corresponding to multiple information documents.

Databases 112 and 118, for example, can be used to compute task probability, given a user query, denoted by P(task|query). Database 114, for example, can be used to compute the probability of a given document being relevant, given a user query and a task, denoted by P(D|query, task). Databases 116 and 120 can be used to compute the explicit document dependency denoted by $P(D_2|D_1)$. Additionally, given a user query q, a hypothesized task T and an already-shown document $D_1$, the probability of a document $D_2$ being dependent on $D_1$ can be computed as $P(D_2|D_1, q) = P(T|q)*P(D_2|q, T)*P(D_2|D_1)$. P(task|query) is described further herein.

Further, as part of the offline component, at least one embodiment of the invention includes determining, via query association module 104, an association between user queries, provided via a user interface such as 102, and one or more search tasks maintained in database 106. This can be denoted, for example, via P(Task=T|query=q). This is useful because a query can belong to multiple tasks. This can be computed, for example, as the ratio of the number of times query=q appears in Task=T (obtained from Databases 112 and 118), and the number of times query=q appears overall. The search task (or tasks) determined to be associated with a user query can be provided to and/or applied to the dependency determination module 110 to identify various information documents and/or categories of information documents derived from the above-noted dependency analysis among the multiple databases.

As part of the online component, given a user query q (such as submitted via user interface 102), at least one embodiment of the invention includes utilizing one or more metrics (such as detailed herein) for generating a recommended and/or optimal sequence of information documents via dependency recommendation module 122 based additionally on the dependency analysis carried out via dependency determination module 110.

For instance, the search task T determined to be associated with the query q and applied to the dependency determination module 110 (as noted above), may identify two information documents or two types or categories of information documents ($D_i$ and $D_j$) that correspond (historically) to this search task. Accordingly, as carried out via the dependency recommendation module 122, the relevance of the document $D_i$ to the query q can be represented as $P(D_i|q)$. This can be computed, for example, as the ratio of the total number of times document $D_i$ was shown and clicked in response to a given query q based on the information stored in the database 114. The relevance of the query q to the task T can be represented as P(T|q). Further, the dependency of the document $D_i$ to document $D_j$, which, as noted, is also relevant to the query context provided by the task T, can be represented as $P(D_i|D_j, T)$. Additionally, at least one embodiment of the invention includes determining and presenting a set of possibilities P(Task=T|query=q), each corresponding to one possible task ($T_j$).

Accordingly, as detailed herein, for each such potential task T, a recommended and/or optimized order of documents is generated and presented to the user (that is, the user that submitted the query q), via user interface 102, for example, by which the user can efficiently consult the information provided in the noted documents. In the offline computation, $P(D_2|D_1)$ can be computed based on databases 116 and 120. P(Task|query) can also be computed in offline mode. In the online portion of the processing, $P(D_2|D_1, query, T)$ can be computed as $P(Task|query)*P(D_2|query\ T)*P(D_2|D_1)$, where $P(D_2|D_1)$ and P(Task|query) have been computed in the offline portion.

By way of illustration of one or more embodiments of the invention, consider the following example scenario. A query is submitted that states "Travelling to Thailand." Such a query may return results covering aspects such as foreign regulations and/or travel advice, visa requirements, hotel reviews, things to do in Thailand, weather in Thailand, etc. Accordingly, at least one embodiment of the invention includes determining that this query is related to accomplishing the larger task of identifying and/or compiling a variety of information pertaining to travelling to Thailand and determining and/or identifying information from multiple sources that are to be exploited and/or leveraged to present results (from these multiple sources) to the user in a recommended order.

As described herein, the recommended order of information documents can be derived and/or determined from previous browsing histories of users' previously submitted queries similar or related to the stated "Travelling to Thailand" query provided by the current user. For example, one previous browsing history corresponding to a query for "end-to-end planning of a trip to Thailand" might be associated with a stored ordering of information document results as follows: Advice for tourists in Thailand→Visa information→Tickets→Hotels in Thailand→Things to do in Thailand→Weather in Thailand. A second previous browsing history corresponding to a query for "things to do in Thailand" might be associated with a stored ordering of information document results as follows: Amusements in Thailand→Events in Thailand→Places to stay in Thailand→Restaurants in Thailand. Further, a third previous browsing history corresponding to a query for "health and weather advice in Thailand" might be associated with a stored ordering of information document results as follows: Thailand travel advice→Recent health hazards in Thailand→Weather forecast in Thailand.

Based, for instance, on previous browsing histories such as these, one example ordering may be presented as follows: Travel advice→Visa requirements→Download and submit application→Ticketing→Hotel reviews and booking→Things to do in Thailand→Climate in Thailand→Pictures of Thailand, etc.

Figure 2:
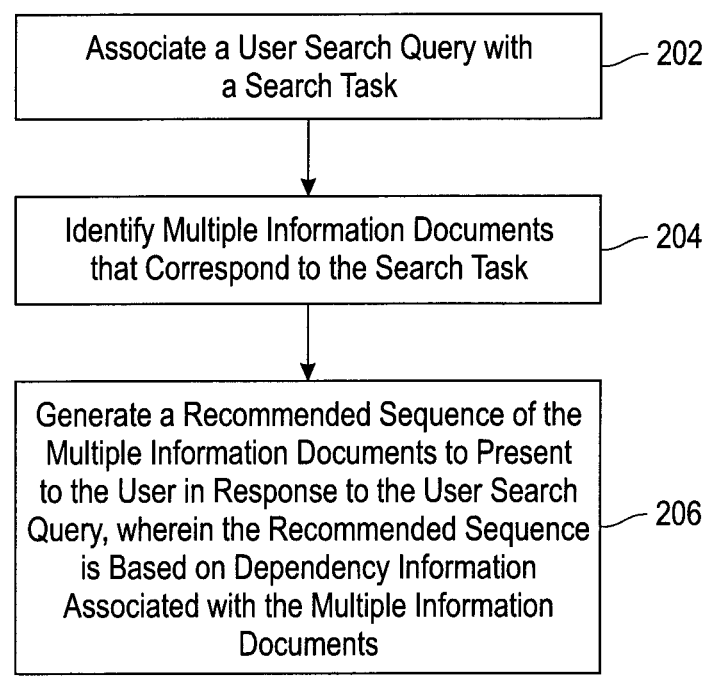
FIG. 2 is a flow diagram illustrating techniques according to an embodiment of the invention.

FIG. 2 is a flow diagram illustrating techniques according to an embodiment of the present invention. Step 202 includes associating a user search query with a search task. At least one embodiment of the invention can additionally include receiving the user search query via a user interface.

Step 204 includes identifying multiple information documents that correspond to the search task. Identifying multiple information documents that correspond to the search task can be based on one or more previous user search histories.

Step 206 includes generating a recommended sequence of the multiple information documents to present to the user in response to the user search query, wherein the recommended sequence is based on dependency information associated with the multiple information documents. Dependency information can include context-dependent information pertaining to the multiple information documents derived from one or more previous user search histories.

Additionally, as described herein, generating the recommended sequence can include executing one or more metrics. For example, this can include determining a measure of relevance of each of the multiple information documents to the user search query. This can also include determining a measure of relevance of the user search query to the search task, as well as determining a measure of relevance of each of the multiple information documents to each of one or more other documents from the multiple information documents.

The techniques depicted in FIG. 2 can additionally include determining an association between multiple search queries and one or more search tasks, wherein each said association is maintained in a database. Further, the techniques depicted in FIG. 2 can include displaying the recommended sequence of the multiple information documents to the user. Also, at least one embodiment of the invention includes generating a set of multiple recommended sequences of the multiple information documents.

Figure 3:
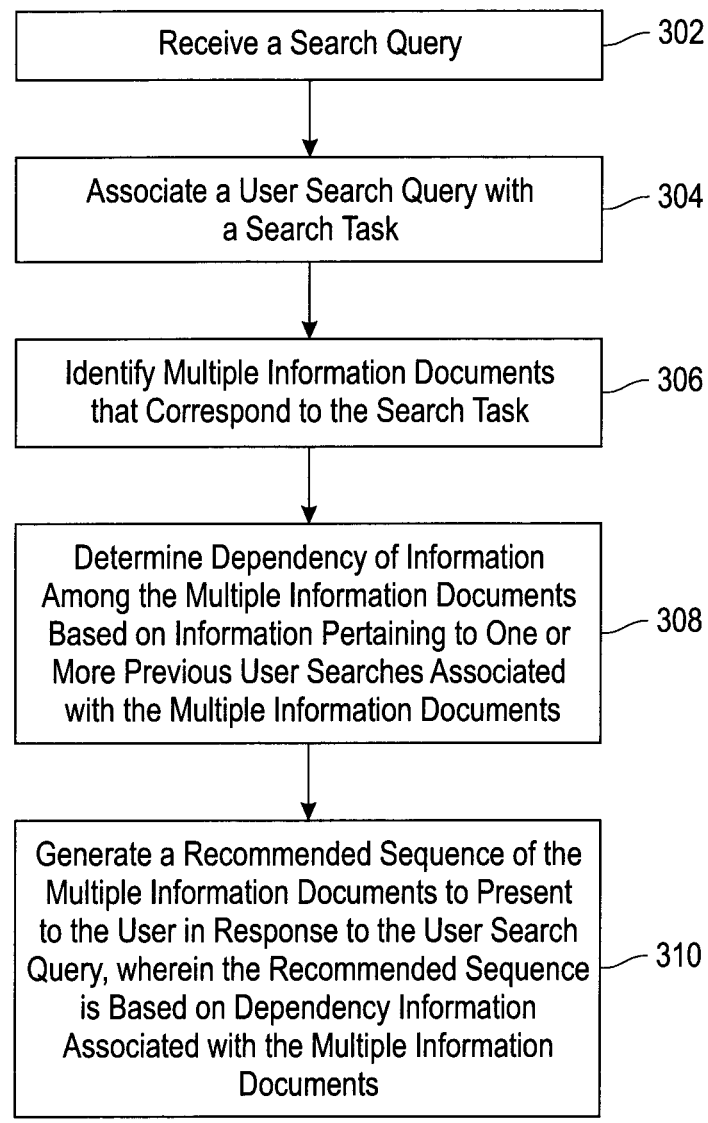
FIG. 3 is a flow diagram illustrating techniques according to an embodiment of the invention.

FIG. 3 is a flow diagram illustrating techniques according to an embodiment of the invention. Step 302 includes receiving a user search query (for example, via a user interface). Step 304 includes associating the user search query with a search task. Step 306 includes identifying multiple information documents that correspond to the search task.

Step 308 includes determining dependency of information among the multiple information documents based on information pertaining to one or more previous user searches associated with the multiple information documents. Information pertaining to one or more previous user searches associated with the multiple information documents can include, for example, one or more previous user queries and corresponding session logs, one or more click-through logs, one or more outbound links present in the multiple information documents, case documentation information, and procedural information corresponding to the multiple information documents.

Additionally, step 310 includes generating a recommended sequence of the multiple information documents to present to the user in response to the user search query, wherein the recommended sequence is based on dependency information associated with the multiple information documents. Further, the techniques depicted in FIG. 3 can include displaying the recommended sequence of the multiple information documents to the user.

The techniques depicted in FIG. 2 and FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 and FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 4:
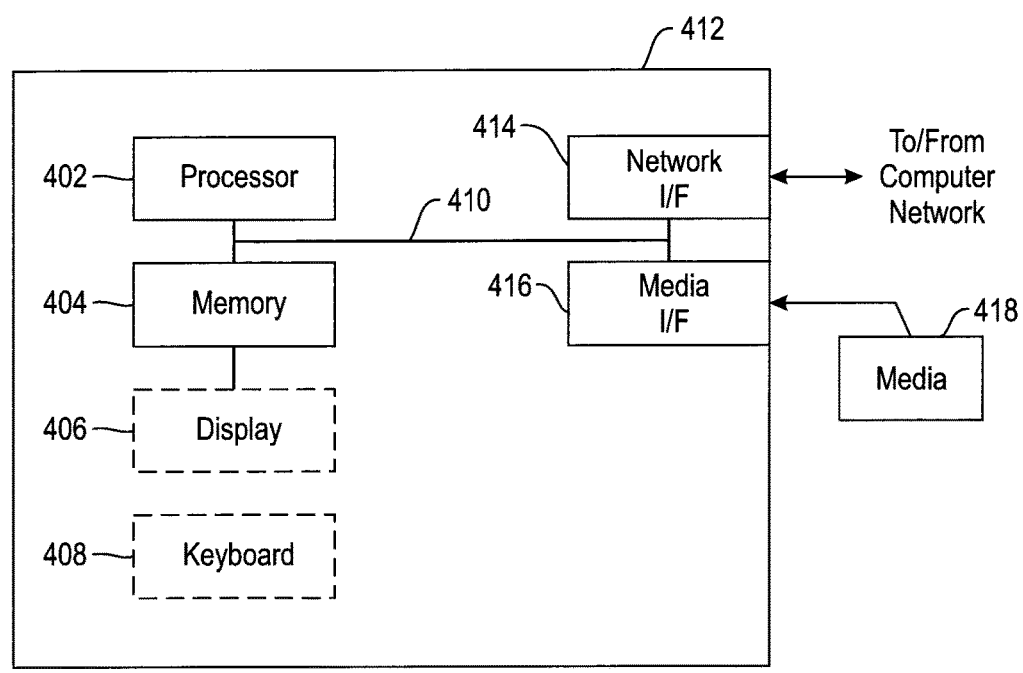
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, exploiting dependency and ordering among search results.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    associating a user search query (q) with a search task (T), wherein the search task comprises a sequence of multiple distinct user search queries that share a common context;
    identifying multiple information documents that correspond to the search task, wherein the multiple information documents comprise one or more information documents that correspond to each of the multiple distinct user search queries of the search task; and
    generating a recommended chronologically-ordered sequence of the multiple information documents to present to the user in response to the user search query, wherein the recommended chronologically-ordered sequence is based on (i) the sequence of the multiple distinct user search queries of the search task and (ii) dependency information associated with the multiple information documents, wherein said dependency information comprises (a) determined measure of importance that a user accesses the contents of a first of the multiple information documents before proceeding to the contents of a second of the multiple information documents, and (b) a determined measure of relevance of each of the multiple information documents to each of one or more other documents from the multiple information documents, wherein the determined measure of relevance comprises a computed probability of the second information document ($D_2$) being dependent on the first information document ($D_1$), and wherein said probability (P) is computed via $P(D_2|D_1, q)= P(T|q)*P(D_2|q, T)*P(D_2|D_1)$.

2. The method of claim 1, comprising determining an association between multiple search queries and one or more search tasks.

3. The method of claim 2, wherein each said association is maintained in a database.

4. The method of claim 1, wherein said identifying comprises identifying multiple information documents that correspond to the search task based on one or more previous user search histories.

5. The method of claim 1, wherein said dependency information further comprises context-dependent information pertaining to the multiple information documents derived from one or more previous user search histories.

6. The method of claim 1, wherein said generating comprises determining a measure of relevance of each of the multiple information documents to the user search query.

7. The method of claim 1, wherein said generating comprises determining a measure of relevance of the user search query to the search task.

8. The method of claim 1, comprising: generating a set of multiple recommended chronologically-ordered sequences of the multiple information documents.

9. The method of claim 1, comprising: displaying the recommended chronologically-ordered sequence of the multiple information documents to the user.

10. The method of claim 1, comprising: receiving the user search query via a user interface.

11. An article of manufacture comprising a non-transitory computer readable storage medium having computer readable instructions tangibly embodied thereon which, when implemented, cause a computer to carry out a plurality of method steps comprising:

associating a user search query (q) with a search task (T), wherein the search task comprises a sequence of multiple distinct user search queries that share a common context;

identifying multiple information documents that correspond to the search task, wherein the multiple information documents comprise one or more information documents that correspond to each of the multiple distinct user search queries of the search task; and generating a recommended chronologically-ordered sequence of the multiple information documents to present to the user in response to the user search query, wherein the recommended chronologically-ordered sequence is based on (i) the sequence of the multiple distinct user search queries of the search task and (ii) dependency information associated with the multiple information documents, wherein said dependency information comprises (a) a determined measure of importance that a user accesses the contents of a first of the multiple information documents before proceeding to the contents of a second of the multiple information documents, and (b) a determined measure of relevance of each of the multiple information documents to each of one or more other documents from the multiple information documents, wherein the determined measure of relevance comprises a computed probability of the second information document ($D_2$) being dependent on the first information document ($D_1$), and wherein said probability (P) is computed via $P(D_2|D_1, q) = P(T|q)*P(D_2|q, T)*P(D_2|D_1)$.

12. A system comprising:
a memory; and
at least one processor coupled to the memory and configured for:
associating a user search query (q) with a search task (T), wherein the search task comprises a sequence of multiple distinct user search queries that share a common context;
identifying multiple information documents that correspond to the search task, wherein the multiple information documents comprise one or more information documents that correspond to each of the multiple distinct user search queries of the search task; and
generating a recommended chronologically-ordered sequence of the multiple information documents to present to the user in response to the user search query, wherein the recommended chronologically-ordered sequence is based on (i) the sequence of the multiple distinct user search queries of the search task and (ii) dependency information associated with the multiple information documents, wherein said dependency information comprises (a) a determined measure of importance that a user accesses the contents of a first of the multiple information documents before proceeding to the contents of a second of the multiple information documents, and (b) a determined measure of relevance of each of the multiple information documents to each of one or more other documents from the multiple information documents, wherein the determined measure of relevance comprises a computed probability of the second information document ($D_2$) being dependent on the first information document ($D_1$), and wherein said probability (P) is computed via $P(D_2|D_1, q) = P(T|q)*P(D_2|q, T)*P(D_2|D_1)$.

13. A computer-implemented method comprising:
receiving a user search query (q);
associating the user search query with a search task (T), wherein the search task comprises a sequence of multiple distinct user search queries that share a common context;
identifying multiple information documents that correspond to the search task, wherein the multiple information documents comprise one or more information documents that correspond to each of the multiple distinct user search queries of the search task;
determining dependency of information among the multiple information documents based on information pertaining to one or more previous user searches associated with the multiple information documents, wherein said dependency information comprises (i) a determined measure of importance that a user accesses the contents of a first of the multiple information documents before proceeding to the contents of a second of the multiple information documents, and (ii) a determined measure of relevance of each of the multiple information documents to each of one or more other documents from the multiple information documents, wherein the determined measure of relevance comprises a computed probability of the second information document ($D_2$) being dependent on the first information document ($D_1$), and wherein said probability (P) is computed via $P(D_2|D_1, q)=P(T|q)*P(D_2|q, T)*P(D_2|D_1)$; and
generating a recommended chronologically-ordered sequence of the multiple information documents to present to the user in response to the user search query, wherein the recommended chronologically-ordered sequence is based on (i) the sequence of the multiple distinct user search queries of the search task and (ii) the dependency information associated with the multiple information documents.

14. The method of claim 13, wherein said receiving comprises receiving the user search query via a user interface.

15. The method of claim 13, wherein said information pertaining to one or more previous user searches associated with the multiple information documents comprises one or more previous user queries and one or more corresponding session logs.

16. The method of claim 13, wherein said information pertaining to one or more previous user searches associated with the multiple information documents comprises one or more click-through logs.

17. The method of claim 13, wherein said information pertaining to one or more previous user searches associated with the multiple information documents comprises one or more outbound links present in the multiple information documents.

18. The method of claim 13, wherein said information pertaining to one or more previous user searches associated with the multiple information documents comprises case documentation information.

19. The method of claim 13, wherein said information pertaining to one or more previous user searches associated with the multiple information documents comprises procedural information corresponding to the multiple information documents.

* * * * *